(12) United States Patent
Guenther

(10) Patent No.: US 6,356,762 B1
(45) Date of Patent: Mar. 12, 2002

(54) METHOD FOR THE OPERATION OF A RADIO SYSTEM AND SYSTEM TO EXECUTE THE METHOD

(75) Inventor: Christoph Guenther, Bettlach (CH)

(73) Assignee: Ascom Business Systems AG, Solothurn (CH)

( * ) Notice: Subject to any disclaimer, the term of this patent is extended or adjusted under 35 U.S.C. 154(b) by 0 days.

(21) Appl. No.: 09/154,455

(22) Filed: Sep. 16, 1998

(30) Foreign Application Priority Data

Sep. 16, 1997 (EP) ............................................ 97810664

(51) Int. Cl.[7] ................................................ H04G 7/20
(52) U.S. Cl. ........................................ 455/456; 455/435
(58) Field of Search ................................. 455/462, 463, 455/465, 435, 456, 554, 555, 218, 212, 194.1, 426, 552, 424

(56) References Cited

U.S. PATENT DOCUMENTS 5,526,402 A * 6/1996 Dent et al. ..................... 379/59
5,535,259 A * 7/1996 Dent et al. ..................... 379/59
5,581,597 A * 12/1996 Dent et al. ..................... 379/59
5,594,782 A   1/1997 Zicker et al.

FOREIGN PATENT DOCUMENTS

WO    9316534    8/1993
WO    9709835    3/1997

* cited by examiner

Primary Examiner—Nguyen T. Vo
Assistant Examiner—Melody Mehrpour

(57) ABSTRACT

A method for the operation of a radio system (28) includes muting, the fixed station (25) of the radio system (28) when no operable mobile telecommunication terminal (30) is located in its coverage area (20). A system to execute the procedure comprises a fixed station (25) for the radio system (28) and a mobile telecommunication terminal (30) suited to communicate with the radio system (28). The fixed station (25) has a circuit to detect an operable mobile telecommunication terminal (30) in its coverage area (20) and a circuit to mute the transmitter of the fixed station (25), depending on the state of the detection circuit. The mobile telecommunication terminal (30) has a circuit to determine its position—preferably based on signals of another radio system (18)—and to check whether that position is basically located within the coverage area (20) of a fixed station (25) of the radio system (28) with which it is entitled to communicate, as well as a circuit to execute a registration procedure which can trigger the activation of the radio system (28).

12 Claims, 1 Drawing Sheet

METHOD FOR THE OPERATION OF A RADIO SYSTEM AND SYSTEM TO EXECUTE THE METHOD

FIELD OF INVENTION

The invention concerns a method for the operation of a radio system and a system to execute the method.

DESCRIPTION OF RELATED ART

Due to their difference in application, different technical norms with regard to transmitter frequencies, transmission journals, working ranges etc. were developed originally for mobile radio systems on the one hand and for radio systems for the purpose of wireless telephony on the other hand. This led to the fact that in most cases there is no compatibility between mobile radio systems, as they are for example used for automobile telephony, and the so-called CT systems (CT=cordless telephone), i.e. small-scale radio systems for wireless telephony.

Not always, but frequently, mobile radio systems (e.g. GSM systems) are cellular systems with a coverage area that is structured in a cell-like fashion. In each cell the mobile stations communicate via an air interface with a fixed base station. The base station can be connected with other cells of the same mobile radio system and/or other telecommunication system via suitable communication links (e.g. hard-wire telecommunication systems, beam links, radio links, etc.). Typical ranges of mobile radio systems (i.e. cell radii for cellular systems) are between a few km and about 60 km. In the case of cellular mobile radio systems, frequency allocation occurs usually based on active cell planning.

In contrast, CT systems usually comprise one or several fixed stations/parts which are hooked to the connection of a hard-wire fixed system, and one or several portable, wireless handsets or wireless telephones (portable parts) which can communicate with the fixed part via a radio interface. Typical ranges are between 50 m and several 100 m. Frequency allocation generally occurs with a dynamic, automatic procedure for frequencies that happen to be free at that time.

On the user side, there is a large need for a mobile telecommunication device, e.g. in the form of a hand mobile telephone which can be used both as a wireless telephone in one or several (small-scale) CT systems and as a mobile station for one or several (large-scale) mobile radio systems. Such a telecommunication device, which can be used in at least two different radio systems, is called a DMT (Dual Mode Terminal). Ideally the user of a DMT can always be reached at the same phone number, regardless which of the different radio systems he used to communicate with. This, however, depends heavily on the network support for such a service.

Several suggestions were submitted for the combined operation of large-scale mobile radio systems and small-scale radio systems. There are, for example, suggestions for the combination of a mobile radio system, according to the GSM standard, with a radio system operated in accordance with a standard developed for CT systems, particularly DECT.

For the production of relatively simple and inexpensive DMTs for the combined operation in a mobile radio system and a CT system, it is desirable that most of the components, such as antenna, receiver, transmitter etc., can be used for both the mobile radio system and the CT system. For this reason a more recent suggestion plans for the combination of a GSM mobile radio system with a CT system, which is operated according to a GSM norm modified for wireless telephony. A portion of the modification for this so-called GSM-CTS (CTS means "Cordless Telecommunication System") affects the GSM system control channels. The base station of a "normal" GSM mobile radio system continuously transmits system-relevant data via special system control channels like identification of the base station, frequencies and channels used by the base station and possibly neighboring cells, etc. Much of this data is only required for the operation of a mobile radio system, but not for the operation of a CT system. To reduce the channel load, the so-called HBS (Home Base Station=fixed part or fixed station of a CT system operated according to GSM-CTS) therefore only emits system-relevant data required for CT operation instead of all GSM system control channels on a so-called beacon channel. Among other things, on the beacon channel an identification signal is transmitted continuously, based on which the DMTs can determine whether they are still in the coverage area of the HBS.

Mobile radio systems and wireless telephones have become more widespread over the last few years. Apart from speech transmission, newer systems also offer telefax and/or data transmission (e.g. computer communication). Although the frequency area made available for mobile radio systems and/or CT systems is relatively large by existing standards, capacity limits are already being met due to the wide-spread availability of these systems. We should therefore strive to use the limited resources of available frequency channels sparingly and use them efficiently.

For simplicity reasons, the terms "frequency" or "carrier frequency" are used in the following even if not only one, but actually a pair of so-called duplex frequencies or duplex carrier frequencies are used, e.g. to send from a base station to a mobile station (down-link) or vice versa (up-link). In the following, "channel" means the resource that is required to transmit signals or user data via the air interface. In the GSM, for example, a channel consists of a combination of a certain carrier frequency and a certain time slot. A mobile telecommunication terminal is a telecommunication terminal (telephone, telefax machine, data transfer modem etc.) which sends and/or receives electromagnetic waves via an air interface for communication purposes. A mobile telecommunication terminal that can be used for at least two different radio systems is called a DMT (Dual Mode Terminal). A fixed station/fixed part is generally a typical fixed radio station, in the particular case of the CT system it is its fixed part. However, in the example of a car phone equipped for tandem operation the fixed part is not really fixed because the fixed station in this case consists of a part of the device that is fastened (fixed) in the car. The coverage area of a radio station is the area in which a mobile telecommunication terminal can communicate with the radio station via the air interface.

SUMMARY OF THE INVENTION

The invention is based on the task of making a method available for the operation of a radio system that ensures efficient utilization of a limited resource of available channels in a limited frequency range.

According to the invention, a method for the operation of a radio system includes muting a fixed station of the radio system when no operable mobile telecommunication terminal is located within the station's coverage area. Muting by definition defines that no electromagnetic signals are sent via the transmitter, in particular this defines that no system-relevant data is sent via a beacon channel or a system control channel and no signals are sent for data or speech transmission i.e. that the transmitter of the fixed station is entirely muted. Preferably, a mobile telecommunication terminal that is capable to communicate with one or several other radio systems frequently monitors the busying of the channels by other radio systems. When this telecommunication terminal initially only sends on free channels itself and secondly informs the fixed station repeatedly of free and available channels on which it can transmit, then this would largely prevent that other radio systems with access to the same frequencies interfere with the radio system operated according to the method invented. In addition, other independent systems of the same type as well are not disturbed at all or only minimally. If there is no operable mobile telecommunication terminal any longer in the coverage area of the radio system's fixed station, then no frequencies or channels are used by the radio system because the fixed station is being muted; the limited frequency bands are kept available for efficient utilization that is free from interferences.

In contrast to the invention, procedures used until now for the operation of radio systems do not provide for muting the transmitter of a fixed station as soon as no operable mobile telecommunication terminal is located in its coverage area. Procedures used in CT systems like DECT and GSM-CTS rather plan that the fixed station, transmits signals continuously via e.g., a system control channel or a beacon channel in order to signal to mobile telecommunication terminals the availability of the fixed station. If there is no operable mobile telecommunication terminal close to the fixed station, a portion of the available channels is thus continuously busied unnecessarily by the system control or beacon channel.

Furthermore, the utilization of channels by other radio systems can change during the extended absence of the mobile telecommunication terminal. A channel that was determined to be free at an earlier time with the help of the mobile telecommunication terminal may possibly not be available any longer. If such a channel is used as a beacon channel it can possibly cause considerable interference. The fixed station of the radio system can only determine this to a limited extent because only the signal of the base station of the other system allows for the most reliable evaluation and because the fixed station has no receiver for this signal for complexity and cost reasons.

A system to execute the procedure in accordance with the invention includes a fixed station for the radio system and a mobile telecommunication terminal suited to communicate with the radio system.

A fixed station in accordance with the invention has a circuit for the purpose of detecting an operable mobile telecommunication terminal in its coverage area and a circuit for the purpose of muting the transmitter of the fixed station, which is dependent on the state of the detection circuit.

A mobile telecommunication terminal in accordance with the invention has a circuit for the purpose of determining its position and examining whether that position is basically within the coverage area of a fixed station of the radio system with which it is entitled to communicate as well as a circuit for the purpose of registering the telecommunication terminal when the latter state occurs.

Preferably the method in accordance with the invention, includes the fixed station sending a identification signal via a pre-determined channel when there is at least one operable mobile telecommunication terminal in its coverage area in order to signal to the mobile telecommunication terminal the availability of the fixed station.

In the case of a preferred embodiment of the method in accordance with the invention, a mobile telecommunication terminal suited to communicate (via a radio interface) with the radio system determines its position from time to time and checks whether that is basically located within the coverage area of a fixed station of the radio system with which it is entitled to communicate. If this applies, the mobile telecommunication terminal checks whether there are free channels suited to communicate with the fixed station. If that applies as well, the mobile telecommunication terminal begins communicating with the fixed station by sending out signals to pre-determined channels, which the fixed station continuously monitors, and it tries to register with the fixed station. Successful registration is only possible when, among other things, the mobile telecommunication terminal is actually located within the coverage area of the fixed station and when the identification and authentication procedure integrated into the registration process is successful, i.e. when it is actually entitled to use the fixed station or the fixed station network. Not until at least one mobile telecommunication terminal has registered does the fixed station begin to send an identification signal. Due to the identification signal, the fixed station so-to-speak becomes visible to the mobile telecommunication terminal. Even after its registration with the fixed station, the mobile telecommunication device monitors the busying of channels by other radio systems in order to enable a transfer of the identification signal to another channel or a transfer of data channels, if necessary.

The mobile telecommunication terminal can use data from a cellular radio system, a locating system, such as GPS, Loran-C, Omega, or from any other system to determine its approximate position. Completely accurate position determination is not necessary because during the course of an applicable registration process it turns out whether the mobile telecommunication terminal is within the coverage area of the fixed station or not.

In one embodiment of the invention, the radio system consists of a CT system. The CT system can be operated according to a GSM-CTS, CT1, or DECT standard or any other standard suited for CT systems.

In a preferred embodiment of the invention, the mobile telecommunication terminal is suited to communicate with another radio system (the telecommunication terminal is therefore a DMT) and determines its position based on signals it receives from the other radio system. The other radio system can consist, for example, of a mobile radio system, particularly a GSM mobile radio system. To determine its position with the help of a GSM system, the base stations visible to the mobile telecommunication terminal, the relative delays of their signals, the field intensity of the signals and/or other data can be used. The two radio systems should preferably operate in an overlapping fashion, at least partially. If the two systems consist of e.g. a CT system and a GSM system and the DMT conducts its position determination based on the GSM data, the coverage area of each CT fixed station must overlap at least partially with one GSM cell because otherwise they cannot be 're-wakened' after an appropriate muting phase of the CT fixed station. Cells that are located entirely outside the other radio system can leave their beacon or broadcast channel turned on permanently because it does not interfere in this particular case.

The mobile telecommunication terminal preferably monitors the identification signal of the fixed station on a continuous basis after having registered with the fixed station in order to be able to recognize that a leaving of the fixed station's coverage area is imminent based on a weakening of the identification signal. As soon as a leaving of the area is recognized based on the weakening of the identification signal, the mobile telecommunication terminal can cancel its registration with the fixed station. If the mobile telecommunication terminal is a DMT, the DMT will preferably only cancel its registration if it can register with another radio system at the same time. In the case of a DMT for a CT system and a GSM system, this e.g. prevents that the DMT cancels its registration with the CT system's fixed station if it moves, for example, for a short time into a cellar where it is located neither in the CT system's coverage area nor in the GMS system's coverage area.

After successful registration with a fixed station, the mobile telecommunication terminal preferably monitors the identification signal of this fixed station and renews its registration from time to time, as long as it can recognize—based on the identification signal—that it is still located within the fixed station's coverage area. Registration of the mobile telecommunication terminal with the fixed station is preferably canceled if it has not been renewed within the specified time frame since the last registration. This prevents mobile telecommunication terminals from remaining registered with the fixed station when they e.g. do not cancel correctly due to a sudden event.

With the invention, a method for operating a radio system as well as a system for executing this method are made available, which will ensure efficient usage of the channels in a limited frequency range. The method in accordance with the invention enables particularly the combined operation of a GSM mobile radio system with a CT system that is operated according to a GSM standard modified for the purpose of wireless telephony, with both systems utilizing the same limited frequency range reserved for GSM.

In connection with enclosed drawing, the following detailed description of the presented invention serves only as an example for a better understanding of the invention and is not to be regarded as a limitation to the scope of protection of the patent claims. The following description, combined with the enclosed drawing and the entire patent claims, will provide an expert undoubtedly with further advantageous embodiments and combinations of features, which are still within the range of the presented invention.

BRIEF DESCRIPTION OF THE DRAWINGS

The drawing depicts a preferred embodiment of the presented invention.

DETAILED DESCRIPTION OF THE INVENTION

Figure 1:
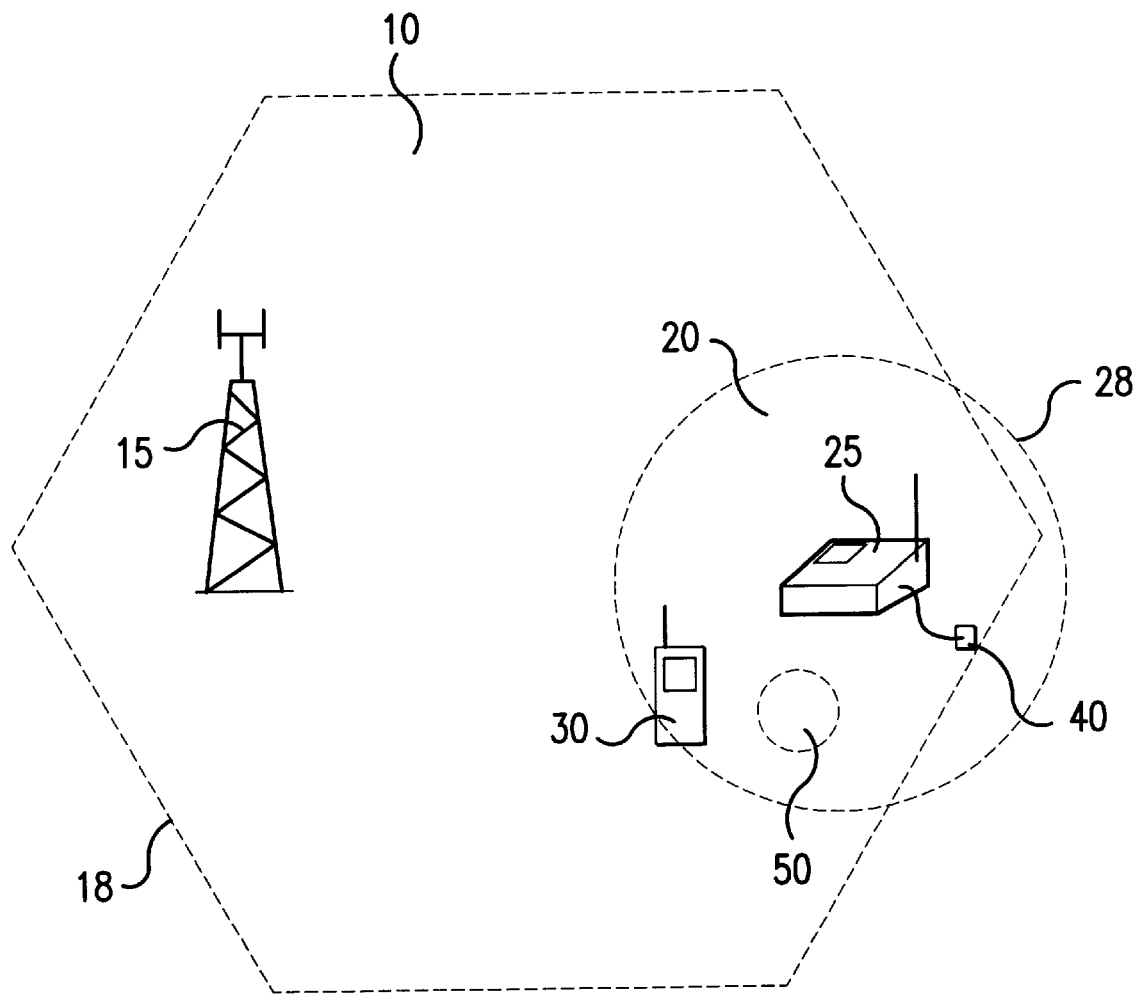
FIG. 1 a simplified diagrammatic view of two different overlapping radio systems, of which one is operated in accordance with the invented method.

FIG. 1 represents a simplified radio system in the form of a CT system 28, which is operated according to the method of the invention, as well as a GSM mobile radio system 18 overlapping in its operation with the CT system 28. A fixed station 25 (fixed part) of the radio system 28 has a coverage area 20. The fixed station 25 is connected to a fixed, hard-wire telecommunication network via a connection 40. There is a mobile telephone 30 (portable part) for the fixed station 25 of the radio system 28. A base station 16 of the mobile radio system 18 defines a (hexagonally shown) cell 10, with the mobile radio system 18 comprising other cells and base stations (not shown). The cell 10 and the coverage area 20 are arranged so that they overlap geographically, at least in part. The two radio systems 18, 28 also overlap in their operation with regard to frequencies, with the radio system 28 being operated in accordance with the GSM-CTS standard and the mobile radio system 18 in accordance with the GSM standard.

The mobile telephone 30 is also equipped as a GSM hand mobile telephone 30 (mobile station) for operation in the macro-cellular GSM system. It can communicate both with the fixed station 25 of the GSM-CTS system and with the base station 15 of the GSM system via an air interface and is therefore a DMT (dual mode terminal). During GSM-CTS operation, a call is transmitted from the DMT 30 via an air interface to the fixed station 25 and from there via a connection to the network 40 and a hard-wire fixed network to any other connection in the fixed network or to another telecommunication network connected with the fixed network.

During GSM operation, the DMT 30 communicates via radio with the base station 15 of the GSM system 18 and functions like any GSM handy. A call is then transmitted via the cellular GSM mobile radio system 18 and, if necessary, other telecommunication networks connected with this GSM system.

For cost and complexity reasons, the GSM-CTS fixed station 25 (fixed part of the CT system 28) is not equipped with a receiver in the transmission channel and can therefore not receive any signals, especially also no broadcast signals, of the GSM system 18.

If there is no operable DMT 30 in the coverage area 20 of the GSM-CTS fixed station 25, the transmitter of the GSM-CTS fixed station 25 is muted and transmits no signals. In this state, the GSM-CTS base station 25 continuously monitors a set of previously agreed upon channels of the GSM-CTS system.

Through GSM signals of the GSM system 18, such as visible base stations, the relative delay of their signals, the field intensity of the signals etc., the DMT 30 determines its position from time to time and checks whether this position is located within the coverage area of a fixed station of the CT system 28, with which it is entitled to communicate. After the DMT 30 shown in FIG. 1 has determined that it may be located within the coverage area 20 of the fixed station 25 with which it is entitled to communicate, the DMT 30 checks whether there are free channels suited to communicate with the fixed station 25. When this applies as well, the DMT 30 begins its communication with the fixed station 25 by sending signals to pre-determined determined channels which are being monitored continuously by the fixed station 25. Via a registration procedure, where registration signals are transmitted between the DMT 30 and the fixed station 25, the DMT 30 tries to register with the fixed station 25. Successful registration is only possible when, among other things, the DMT 30 is actually located within the coverage area of the fixed station 25 and the identification and authentication procedure integrated into the registration process has been successful, i.e. when it is actually entitled to use the fixed station 25 or the fixed station network. Not until at least one DMT 30 has registered does the fixed station 25 begin to send a an identification signal on the so-called beacon channel of the GSM-CTS fixed station 25. Based on this identification signal, the fixed station 25 becomes quasi visible to the DMT 30. The DMT 30 searches for free channels and, when found, transmits them to the fixed station 25 because the DMT 30—in contrast to the fixed station 25—is equipped to receive signals from GSM base stations of the GSM system 18.

Even after its registration with the fixed station 25, the DMT 30 monitors the busying of the channels by the GSM mobile radio system 18 at regular intervals in order to enable the transfer of the beacon channel to another channel or changes to the free channels planned for communication purposes so that in case of a trunking scheme, e.g. due to a call to the DMT 30, channels which are occupied by the GSM system 18 are not used.

If registration was not successful and no other DMT is registered with the fixed station 25, the fixed station remains muted. When the DMT 30 realizes that another attempt at registration is worthwhile, it will do so. Indications that can be used for this are e.g.: a change in position within the area regarded as the coverage range, the passing of a certain amount of time, etc.

With the DMT 30 initially only transmitting on free channels itself and secondly informing the fixed station 25 repeatedly of available and free channels on which it can transmit, this largely prevents interference of the radio system 28 by the mobile radio system 18, which has access to the same frequencies as the radio system 28, or vice versa.

After its registration with the GSM-CTS fixed station 25, the DMT 30 monitors the signal identification of the fixed station 25 at regular intervals for an early detection of an imminent leaving of the coverage area 20 of the fixed station 25 based on a weakening of the signal. As soon as the DTM 30 recognizes its imminent leaving based on a weakening of the identification signal, the DMT 30 checks whether it is still located within the coverage area 10 of the GSM system 18. If this is the case, the DMT 30 can cancel its registration with the fixed station 25 and register with the mobile radio system 18, if it did not remain registered there. If registration with the fixed station 25 is only canceled when the DMT 30 changes to the other radio system 18, this can prevent that the DMT 30 cancels its registration with the fixed station 25 of the CT system if it moves e.g. into a cellar 50 for a short time which is located neither in the CT system's 28 coverage area nor in the GSM system's 18 coverage area.

As long as the DMT 30 is registered with the base station 25, it monitors the identification signal of the fixed station 25 and renews its registration from time to time if it realizes, based on the identification signal, that it is still located within the coverage area 20 of the fixed station 25. Registration of the DTM 30 with the fixed station 25 is canceled if it is not renewed within a specified time frame since the last registration. This prevents the DMT 30 from remaining registered with the fixed station 25 (and the fixed station 25 from continuing to send its identification signal) if the DMT 30 is not signed off correctly from the fixed station 25 and cancels its registration. Such a premature connection abortion can occur for example when a user removes the battery of a DMT or places the DMT into a metal closet.

In the case of CT systems with several mobile telephones, the fixed station is muted after the last one of a number of registrations with the fixed station has been canceled and therefore no operable mobile telephone is located any longer within the base station's coverage area.

In summary it must be noted that with the invention a method for the operation of a radio system and a system for the execution of the method are made available which ensure efficient utilization of available channels in a limited frequency range. The method in accordance with the invention particularly enables the combined operation of a GSM mobile radio system with a CT system which is operated according to a GSM standard that is modified for the purpose of radio telephony, with both systems using the same limited frequency range that is reserved for GSM.

| Reference List | |
|---|---|
| 10 | Cell of the Mobile Radio System |
| 15 | Base Station of the Mobile Radio System |
| 18 | Mobile Radio System |
| 20 | Coverage Area of a Fixed Station of the Radio System |
| 25 | Fixed Station of the Radio System |
| 28 | Radio System |
| 30 | DMT |
| 40 | Connection of the fixed station of the radio system to a fixed, hard-wire telecommunication network |
| 50 | Area without Coverage by One of the Two Radio Systems |

What is claimed is:

1. A method for the operation of a radio system, comprising the steps of:

muting entirely a fixed station of the radio system when no operable mobile telecommunication terminal is located in a coverage area of the fixed station, the fixed station being muted after the last one of a number of registrations of mobile telecommunication terminals with the fixed station has been canceled and remaining muted as long as no mobile telecommunication terminal is registered with it, and transmitting an identification signal from the fixed station via a predetermined channel if at least one operable mobile telecommunication terminal is located within the coverage area, the fixed station beginning to transmit not until at least one mobile telecommunication terminal has registered with it.

2. The method according to claim 1 further including determining a position from time to time of the mobile communication terminal and, checking whether the position is basically located within the coverage area of the fixed station of the radio system with which it is entitled to communicate, while—if applicable—the mobile telecommunication terminal tries to register with the fixed station as an operable mobile telecommunication terminal via a registration signal.

3. The method according to claim 2, further including sending by the mobile telecommunication terminal the registration signal via a channel out of a set of predetermined channels, which are continuously monitored by the fixed station.

4. The method according to one of the claims 1, 2 and 3, further including operating the radio system in accordance with GSM-CTS standard.

5. The method according to claim 2, communicating further including communicating via the mobile telecommunication terminal with another radio system for determining the mobile telecommunication terminal position based on signals which it receives from the other radio system.

6. The method according to claim 5, overlapping by both radio systems in their operation, which includes geographical operation and frequency operation.

7. The method according to claim 5, further including operating the other radio system as a mobile radio system according to the GSM standard.

8. The method according to claim 1 further including monitoring continuously by the mobile telecommunication terminal an identification signal of the fixed station after its registration with the fixed station, and canceling its registration with the fixed station as soon as it recognizes the imminent leaving of the coverage area of the fixed station based on a weakening of the signal.

9. The method according to claim 2, further including canceling the registration of the mobile telecommunication terminal with the fixed station unless it is renewed within a specified time frame after a last registration.

10. A system for operation of a radio system comprising:
   a fixed station which is entirely muted when no operable mobile telecommunication terminal is located within a coverage area of the fixed station, and
   said fixed station transmits an identification signal when said telecommunication terminal is located within the coverage area of the fixed station.

11. The system according to claim 10 wherein the fixed station includes,
   a circuit to detect an operable mobile telecommunication terminal in a coverage area of the fixed station, and
   means for muting including a circuit to mute a transmitter of the fixed station depending on the operational state of the circuit to detect.

12. The system according to claim 10, including a circuit to determine a position of the mobile telecommunication terminal—preferably based on signals from another radio system and to check whether that position is located largely within the coverage of the fixed station of the radio system with which it is entitled to communicate and a circuit to execute a registration procedure.

* * * * *